(12) United States Patent
Bernsen et al.

(10) Patent No.: US 11,757,874 B2
(45) Date of Patent: *Sep. 12, 2023

(54) MUTUAL AUTHENTICATION SYSTEM

(71) Applicant: KONINKLIJKE PHILIPS N.V., Eindhoven (NL)

(72) Inventors: Johannes Arnoldus Cornelis Bernsen, Eindhoven (NL); Franciscus Antonius Maria Van De Laar, Eindhoven (NL); Ronald Felix Albertus Linders, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 3 days.

This patent is subject to a terminal disclaimer.

(21) Appl. No.: 17/536,149

(22) Filed: Nov. 29, 2021

(65) Prior Publication Data

US 2022/0086146 A1    Mar. 17, 2022

Related U.S. Application Data

(63) Continuation of application No. 16/494,877, filed as application No. PCT/EP2018/056491 on Mar. 15, 2018, now Pat. No. 11,190,506.

(30) Foreign Application Priority Data

Mar. 20, 2017   (EP) .................................. 17161856

(51) Int. Cl.
*H04L 9/32*       (2006.01)
*H04L 9/40*       (2022.01)
(Continued)

(52) U.S. Cl.
CPC ........ *H04L 63/0869* (2013.01); *H04L 9/0844* (2013.01); *H04L 9/3234* (2013.01);
(Continued)

(58) Field of Classification Search
CPC . H04L 63/0869; H04L 9/0844; H04L 9/3234; H04L 9/3273; H04L 2209/80
See application file for complete search history.

(56) References Cited

U.S. PATENT DOCUMENTS 11,190,506  B2 *  11/2021  Bernsen ................ H04L 9/3234
2006/0120531 A1   6/2006  Semple et al.
(Continued)

OTHER PUBLICATIONS

Wifi Device Provisioning Protocol (DPP) Technical Specification Version 0.0.38 2016.
(Continued)

*Primary Examiner* — David J Pearson

(57) ABSTRACT

A wireless communication system enables one-sided authentication of a responder device (120) by an initiator device (110) and mutual authentication of both devices. Embodiments of the initiator may have a message unit (116) and a state machine (117). The initiator starts by acquiring a responder public key via an out-of-band action and sends an authentication request. The responder sends an authentication response comprising responder authentication data based on a responder private key and a mutual progress status indicative of the mutual authentication being in progress for enabling the responder device to acquire an initiator public key via a responder out-of-band action. The initiator state machine is arranged to provide a mutual authenticating state, engaged upon receiving the mutual progress status, for awaiting mutual authentication. Thereby long time-out periods during wireless communication are avoided, while also enabling the initiator to report communication errors to the user within a short time.

14 Claims, 7 Drawing Sheets

(51) Int. Cl.
    *H04L 9/08*     (2006.01)
    *H04W 12/50*     (2021.01)
    *H04W 12/069*     (2021.01)

(52) U.S. Cl.
    CPC ......... *H04L 9/3273* (2013.01); *H04W 12/069* (2021.01); *H04W 12/50* (2021.01); *H04L 2209/80* (2013.01)

(56) References Cited

U.S. PATENT DOCUMENTS

| | | |
|---|---|---|
| 2008/0082449 A1 | 4/2008 | Wilkinson |
| 2010/0042838 A1 | 2/2010 | Ho |
| 2012/0110332 A1 | 5/2012 | Liu |
| 2016/0242030 A1 | 8/2016 | Pang et al. |
| 2017/0099151 A1 | 4/2017 | Kim |
| 2017/0201886 A1 | 7/2017 | Yang |
| 2019/0089532 A1 | 3/2019 | Lambert |

OTHER PUBLICATIONS

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Dec. 2016.
Wi-Fi Simple Configuration—Technical Specification—Version 2.0.5 "Specification for easy, secure setup and introduction of devices into WPA2-enabled 802.11 networks", Wi-Fi Alliance, 2014.
RFC 5297, Synthetic Initialization Vector (SIV) Authenticated Encryption Using the Advanced Encryption Standard (AES), Oct. 2008, (https://datatracker.ietf.org/doc/rfc5297/).
FIPS180-4, "Secure Hash Standard", United States of America, National Institute of Standards and Technology, Federal Information Processing Standard (FIPS) 180-4, 2015.
Diffie, W.; Hellman, M. (1976), "New directions in cryptography", IEEE Transactions on Information Theory, 22 (6): 644-654.
Rivest, R.; Shamir, A.; Adleman, L. (Feb. 1978). "A Method for Obtaining Digital Signatures and Public-Key Cryptosystems", Communications of the ACM. 21 (2): 120-126.
Koblitz, N. (1987). "Elliptic curve cryptosystems". Mathematics of Computation. 48 (177): 203-209.
International Search Report and Written Opinion from PCT/EP2018/056491 dated Jun. 12, 2018.

* cited by examiner

MUTUAL AUTHENTICATION SYSTEM

CROSS REFERENCE TO RELATED APPLICATIONS

This application is a continuation of U.S. application Ser. No. 16/494,877 filed Sep. 17, 2019 which is the US National Stage Application of PCT/EP2018/056491 filed Mar. 15, 2018 which claims priority to EP Application No. 17161856.4 filed Mar. 20, 2017.

FIELD OF THE INVENTION

The invention relates to an initiator device and a responder device arranged for wireless communication according to a communication protocol, and methods and computer program products for use in such devices. The communication protocol comprises an authentication protocol for accommodating an authentication being one of one-sided authentication of the responder device by the initiator device and
mutual authentication of the responder device by the initiator device and of the initiator device by the responder device. The responder device comprises a responder transceiver arranged for wireless communication according to the communication protocol, and a responder processor arranged for processing the communication protocol. The initiator device comprises an initiator transceiver arranged for wireless communication according to the communication protocol, and an initiator processor arranged for processing the communication protocol.

The present invention relates to the field of short-range wireless communication systems, e.g. indoor communication systems, and more in particular provides various devices and methods for securely setting up wireless connections based on authenticating the responder device and/or the initiator device. Wi-Fi, see ref [1], provides an example of a communication protocol and a mechanism to establish wireless device connections.

BACKGROUND OF THE INVENTION

Public keys may be used as a means to identify and authenticate devices in wireless communication. The private key associated with a public key should be generated within each device and protected from disclosure. Devices use public key cryptographic techniques to authenticate peer devices, where the devices have to prove the possession of the private key corresponding to their public key, and establish shared keys for further secure communications. This security architecture simplifies the establishment of secure connectivity between devices and provides a foundation for improved usability in provisioning and connecting devices.

A device which starts an Authentication protocol plays the role of Initiator. The device which responds to an Initiator request plays the role of Responder. The Authentication protocol may provide authentication of a responder to an initiator, and optionally authentication of the initiator to the responder. This assumes that the initiator has obtained a bootstrapping key of the responder to perform unidirectional authentication, and both parties have obtained the bootstrapping keys of each other to optionally perform mutual authentication.

Diffie-Hellman, see ref [6], is a well-known technique for establishing a secret key between two parties, where the communication between the parties does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it may reuse an older key pair.

When performing Diffie-Hellman over a network, a device that receives a public key for performing Diffie-Hellman does not know from which device this public key is. This may be exploited by an attacker in a so-called man-in-the-middle attack. An attacker E might masquerade as the real device B with which device A wants to connect. The attacker E performs Diffie-Hellman with device A and establishes a secret key Kae with device A. Similarly, the attacker masquerades as device A to device B and establishes a secret key Kbe with device B. When a message comes in from one of the devices A or B, the attacker decrypts the message with the one secret key, encrypts it with the other and forwards it to the other device. This way, the devices A and B do not notice anything strange in their communication, except for some extra delay. But the attacker has complete knowledge on what they communicate.

To increase the security of wireless communication a protocol may be used for authentication of one or more of the devices participating in secure wireless communication according to a communication protocol. Such an authentication protocol may be started by a first participating device, usually called an initiator device in communication with a second participating device, usually called a responder device. In the current context, an initiator device may be any electronic device having the capability for setting up a connection using wireless communication. The initiator device may be a stationary device like a PC or an access point or a wireless docking station or a wireless USB hub, or a wireless video or AV monitor, but may also be a portable device like a laptop or a mobile phone. The responder device similarly may be any type of electronic device having the capability for setting up a connection using wireless communication.

So, a communication protocol may include an authentication protocol for accommodating an authentication of the responder and/or the initiator. The authentication may be one-sided authentication of the responder device by the initiator device. Also, the authentication may be mutual authentication, which involves authentication of the responder device by the initiator device and authentication of the initiator device by the responder device.

SUMMARY OF THE INVENTION

In such authentication protocols, e.g. to prevent man-in-the-middle attacks when using Diffie-Hellman, another way of communication may be used for exchanging the public keys, or hashes of the public keys, i.e. other than the wireless communication channel used according to the wireless communication protocol, which is usually called In Band Communication. The other way of communication is commonly called Out-Of-Band (OOB) communication, for example using a visual marker like a bar-code or having the user enter a code.

Moreover, communication protocols commonly have a mechanism to cope with noise and disturbances of the wireless exchange of messages. For example, when no reply is received within a predetermined time-out period, the message is transmitted again. After a predetermined number of retries, the communication protocol may be aborted.

It is an object of the invention to provide a secure wireless communication system for reliably setting up a connection between an initiator device and a responder device, while avoiding unduly long time-out periods during authentication.

For this purpose, devices and methods are provided as defined in the appended claims.

According to an aspect of the invention an initiator device arranged for wireless communication with a responder device according to a communication protocol, the communication protocol comprising an authentication protocol for accommodating an authentication being one of one-sided authentication of the responder device by the initiator device and mutual authentication of the responder device by the initiator device and of the initiator device by the responder device;

the responder device comprising a responder transceiver arranged for wireless communication according to the communication protocol, and a responder processor arranged for processing the communication protocol, wherein the initiator device comprises an initiator transceiver arranged for wireless communication according to the communication protocol, an initiator processor arranged for processing the communication protocol and having an initiator message unit to compose messages to be sent to the responder device and to decompose messages received from the responder device according to the authentication protocol; and an initiator state machine to provide initiator states according to the authentication protocol in dependence on user interaction and messages received from the responder device, the initiator states comprising an initial state for bootstrapping by acquiring a responder public key from the responder device via an initiator out-of-band action, a bootstrapped state indicating that the bootstrapping has been successfully performed by acquiring the responder public key, and an authenticated state indicating that the authentication has been successfully performed;

the initiator message unit arranged to compose messages comprising an authentication request to be sent in the bootstrapped state and comprising an initiator verifier for verifying an initiator public key and a responder verifier for verifying the responder public key;

and arranged to decompose messages comprising an authentication response comprising responder one-sided authentication data based on a responder private key corresponding to the responder public key and a mutual progress status indicative of the mutual authentication being in progress for enabling the responder device to acquire the initiator public key from the initiator device via a responder out-of-band action; and and arranged to compose a mutual authentication confirm comprising a mutual confirm status indicating confirmation of the mutual authentication and mutual initiator authentication data based on the responder public key and an initiator private key corresponding to the initiator public key.

According to a further aspect of the invention, in addition to the one sided authentication method or as an alternative to that, a mutual authentication of the responder device by the initiator device and of the initiator device by the responder device can be performed. According to this aspect, the initiator state machine is arranged to provide a mutual authenticating state, engaged upon receiving the mutual progress status, for awaiting mutual authentication; and the initiator message unit is arranged to decompose a mutual authentication response comprising mutual responder authentication data based on the initiator public key and the responder private key; and the initiator state machine is arranged to engage the authenticated state upon receiving the mutual authentication response and the initiator processor successfully processing the mutual responder authentication data based on the responder public key and an initiator private key corresponding to the initiator public key.

According to a further aspect of the invention a responder device is arranged for wireless communication with an initiator device according to a communication protocol, the communication protocol comprising an authentication protocol for accommodating an authentication being one of one-sided authentication of the responder device by the initiator device and mutual authentication of the responder device by the initiator device and of the initiator device by the responder device;

the initiator device comprising an initiator transceiver arranged for wireless communication according to the communication protocol, an initiator processor arranged for processing the communication protocol, and wherein the responder device comprises a responder transceiver arranged for wireless communication according to the communication protocol, responder processor arranged for processing the communication protocol and having a responder message unit to compose messages to be sent to the initiator device and to decompose messages received from the initiator device according to the authentication protocol, a responder state machine to provide responder states according to the authentication protocol in dependence on user interaction and messages received from the initiator device, the responder states comprising an awaiting state for receiving messages from the initiator, and a responder authenticated state indicating that the authentication has been successfully performed;

the responder message unit arranged to compose messages comprising an authentication response comprising one-sided responder authentication data based on a responder private key corresponding to the responder public key and a mutual progress status indicative of the mutual authentication being in progress;

and arranged to decompose messages comprising an authentication request comprising a initiator verifier for verifying an initiator public key and a responder verifier for verifying the responder public key.

According to a further aspect of the invention, in addition to the one sided authentication method or as an alternative to that, a mutual authentication of the responder device by the initiator device and of the initiator device by the responder device can be performed. According to this aspect, the responder state machine is arranged to provide a mutual responder authenticating state for enabling the responder device to acquire an initiator public key from the initiator device via a responder out-of-band action; and the responder message unit is arranged to compose a mutual authentication response to be sent in the mutual responder authenticating state and comprising mutual responder authentication data based on the initiator public key and a responder private key corresponding to the responder public key;

and arranged to decompose a mutual authentication confirm comprising a mutual confirm status indicating confirmation of the mutual authentication and mutual initiator authentication data based on the responder public key and an initiator private key corresponding to the initiator public key; the responder state machine is arranged to, upon the responder processor successfully processing the initiator authentication data based on the initiator public key and the responder private key, engage the responder authenticated state.

According to a further aspect of the invention there is provided an initiator method for use in an initiator device for wireless communication with a responder device according to a communication protocol, the communication protocol comprising an authentication protocol for accommodating an authentication being one of one-sided authentication of the responder device by the initiator device and mutual authentication of the responder device by the initiator device and of the initiator device by the responder device;

the method comprising providing initiator states according to the authentication protocol in dependence on user interaction and messages received from the responder device, the initiator states comprising an initial state for bootstrapping by acquiring a responder public key from the responder device via an initiator out-of-band action, a bootstrapped state indicating that the bootstrapping has been successfully performed by acquiring the responder public key, and an authenticated state indicating that the authentication has been successfully performed;

composing an authentication request to be sent in the bootstrapped state and comprising a initiator verifier for verifying an initiator public key and a responder verifier for verifying the responder public key;

decomposing an authentication response comprising one-sided responder authentication data based on a responder private key corresponding to the responder public key and a mutual progress status indicative of the mutual authentication being in progress for enabling the responder device to acquire the initiator public key from the initiator device via a responder out-of-band action;

providing a mutual authenticating state, engaged upon receiving the mutual progress status, for awaiting mutual authentication;

decomposing a mutual authentication response comprising mutual responder authentication data based on the initiator public key and the responder private key;

composing a mutual authentication confirm comprising a mutual confirm status indicating confirmation of the mutual authentication and mutual initiator authentication data based on the responder public key and an initiator private key corresponding to the initiator public key; and engaging the authenticated state upon receiving the mutual authentication response and successfully processing the mutual responder authentication data based on the responder public key and an initiator private key corresponding to the initiator public key.

According to a further aspect of the invention there is provided a responder method for use in a responder device for wireless communication with an initiator device according to a communication protocol, the communication protocol comprising an authentication protocol for accommodating an authentication being one of one-sided authentication of the responder device by the initiator device and mutual authentication of the responder device by the initiator device and of the initiator device by the responder device;

the method comprising providing responder states according to the authentication protocol in dependence on user interaction and messages received from the initiator device, the responder states comprising an awaiting state for receiving messages from the initiator, and a responder authenticated state indicating that the authentication has been successfully performed;

composing an authentication response comprising one-sided responder authentication data based on a responder private key corresponding to the responder public key and a mutual progress status indicative of the mutual authentication being in progress;

decomposing an authentication request comprising a initiator verifier for verifying an initiator public key and a responder verifier for verifying the responder public key;

engaging the responder authenticating state upon successfully processing the authentication request;

providing a mutual responder authenticating state for enabling the responder device to acquire an initiator public key from the initiator device via a responder out-of-band action;

composing a mutual authentication response to be sent in the mutual responder authenticating state and comprising mutual responder authentication data based on the initiator public key and a responder private key corresponding to the responder public key;

decomposing a mutual authentication confirm comprising a mutual confirm status indicating confirmation of the mutual authentication and mutual initiator authentication data based on the responder public key and an initiator private key corresponding to the initiator public key;

engaging the responder authenticated state upon successfully processing the mutual initiator authentication data based on the initiator public key and the responder private key.

According to a further aspect of the invention there is provided a computer program product downloadable from a network and/or stored on a computer-readable medium and/or microprocessor-executable medium, the product comprising program code instructions for implementing the above methods when executed on a computer.

The above features have the effect that the authentication protocol both supports one-sided authentication and mutual communication. The protocol is executed by exchanging various messages, which may be composed and decomposed by the respective initiator and responder message units. Furthermore, the sequence of exchanging the messages and processing the elements in the messages may be controlled via respective initiator and responder state machines, which determine the states of the initiator and responder devices during executing the authentication protocol.

Furthermore, the authentication protocol enables using out-of-band (OOB) communication for acquiring a responder public key from the responder device. The out-of-band action at the initiator side may involve receiving the responder public key itself, or encoded responder public key data to verify a responder public key received via a further communication action, e.g. received an in-band message or stored in an earlier communication session. The process of acquiring an initial amount of key material is called bootstrapping. After successful bootstrapping, the initiator may engage the authenticating state for performing the authentication of the responder device.

However, in the event of mutual authentication, the responder device has to acquire an initiator public key from the initiator device via a responder out-of-band action. Exchanging codes via OOB communication may take a long time, for example if user interaction is involved such as reading a code on the initiator device and entering it in the responder device or taking a picture of a machine-readable code such as a barcode or a QR code on the initiator device (in the order of tenths of seconds). Such time is long compared to the time for exchanging messages via the wireless communication (usually milliseconds or less). The initiator device may remain, after sending the authentication request, waiting for the authentication response. For enabling said mutual authentication, a full authentication response needs to provide responder authentication data based also on the initiator public key. The inventors have seen that the full authentication response may be transmitted only after a relatively long time sufficient for the responder OOB action. Hence a long timeout period would be required in a traditional mutual authentication protocol. Disadvantageously, in the event that the authentication request is not received, e.g. due to noise, a retransmission would only occur after said long timeout period.

Also, in the event that the authentication request is not received or in the event that the authentication response contains erroneous data causing the authentication to fail, the user has to wait a long time before the initiator device can let the user know that the authentication has failed. To avoid such long timeout periods, they have provided the authentication response containing the responder authentication data based on a responder private key corresponding to the responder public key, which does not involve any initiator key. Advantageously, such authentication response may be transmitted directly after processing the authentication request, enabling a short timeout in the initiator device upon sending the authentication request. Hence, in the event of noise, a re-transmission will occur based on said short timeout and the user will know much quicker when an authentication attempt has failed.

Moreover, the inventors have seen that such an authentication response may be similar to the response for one-side authentication. However, mutual authentication is to be performed. So, in addition, the above enhanced authentication response further contains a mutual progress status indicative of the mutual authentication being in progress. Also, the initiator state machine is arranged to provide a mutual authenticating state, engaged upon receiving the mutual progress status, for awaiting mutual authentication. Advantageously, in said mutual authenticating state, the initiator device is aware of the mutual authentication, which enables later receiving the mutual authentication response comprising mutual responder authentication data based on the initiator public key and the responder private key.

Subsequently, in the event of successful processing of the received mutual responder authentication data, the initiator transmits the mutual authentication confirm comprising a mutual confirm status indicating confirmation of the mutual authentication and initiator authentication data based on the responder public key and an initiator private key corresponding to the initiator public key.

Hence, by providing the additional mutual authentication state and the mutual progress status in the first authentication response message, mutual authentication is performed without requiring long timeout periods, while in the same authentication protocol also enabling one-sided authentication. Advantageously, in the event of bad conditions for wireless communication, retransmission of the required messages is relatively fast due to short timeout periods.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading, for example included in an application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
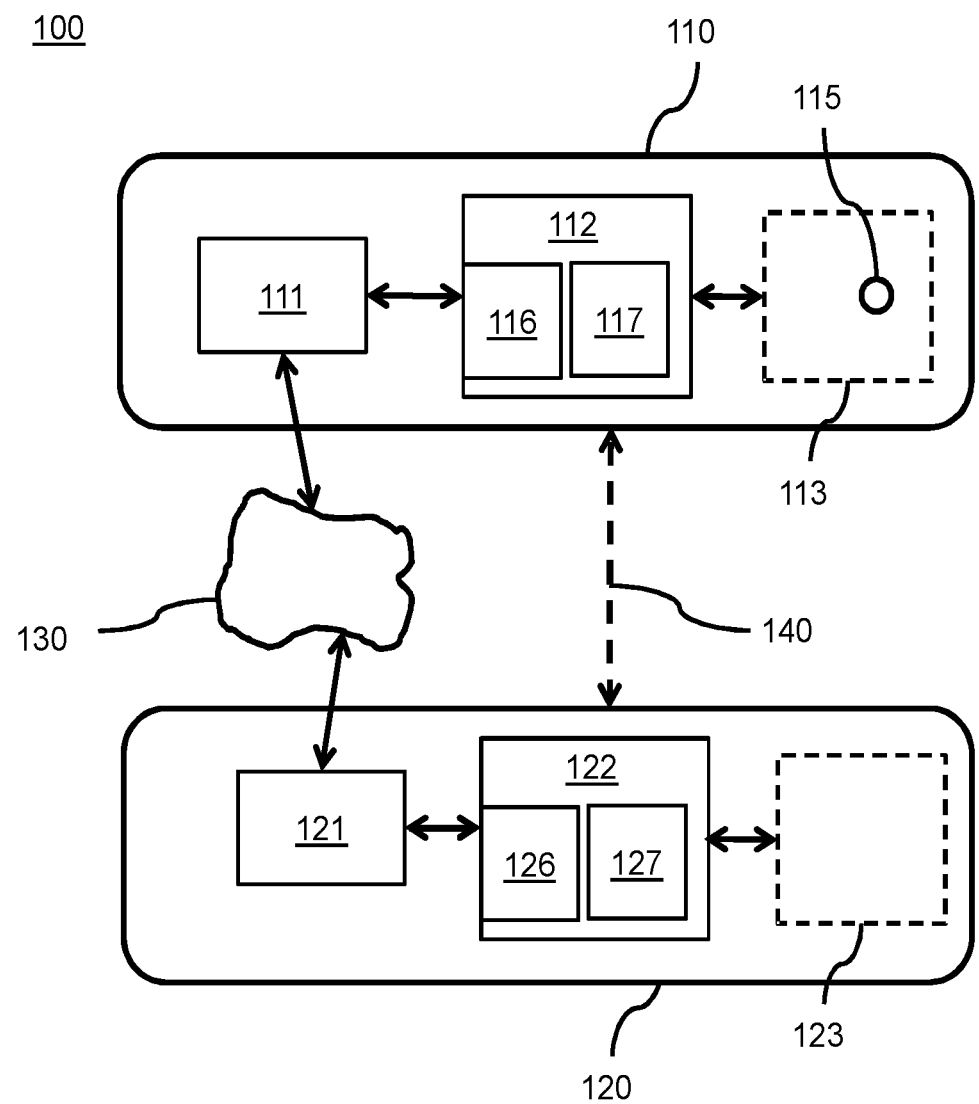
FIG. 1 shows devices for wireless communication and authentication.

The following abbreviations are used:
States:
IST Initial state
BST Bootstrapped
AG1 Authenticating (Initiator, one-way)
AG2 Mutual Authenticating (Initiator, mutual)
ATD Authenticated (Initiator)
AWG Awaiting (Responder)
AR1 Authenticating (Responder, one-way)
AR2 Mutual Authenticating (Responder, mutual)
ARD Authenticated (Responder)
Messages:
ARQ Authentication Request
ARP Authentication Response
ACF1 Authentication Confirm (one-way)
ACF2 Mutual Authentication Confirm
ARP1 Authentication Response (one-way)
ARP2 Mutual Authentication Response
Events/Actions/Status:
OOB Out Of Band (communication action)
OOB_I Out Of Band (communication action by initiator)
OOB_R Out Of Band (communication action by responder)
BA Bad Authentication (event)
BTG Bootstrapping (event)
NP No Peer (event)
TO Timeout (event)
TR Trigger (event)
MPS Mutual Progress Status
MAS Mutual Awaiting Status
MCS Mutual Confirm Status
Keys:
$B_I$ Public bootstrapping key of Initiator
$B_R$ Public bootstrapping key of Responder
$P_I$ Public key of Initiator
$P_R$ Public key of Responder
$b_I$ Initiator private key corresponding to $B_I$
$b_R$ Responder private key corresponding to $B_R$ FIG. 1 shows devices for wireless communication and authentication. A system 100 for wireless communication comprises an initiator device 110 and a responder device 120, the devices being physically apart. The initiator device has an initiator transceiver 111 arranged for wireless communication according to the communication protocol, and an initiator processor 112 arranged for processing the communication protocol. Likewise, the responder device has a responder transceiver 121 arranged for wireless communication according to the communication protocol, and a responder processor 122 arranged for processing the communication protocol. The devices are equipped for wireless communication, as schematically indicated by shape 130 and arrows which connect the transceivers 111, 121. The initiator device may have a user interface 113, which may include well-known elements such as one or more buttons 115, a keyboard, display, touch screen, etc. The responder device may also have a user interface 123. The responder user interface may be arranged for accommodating user interaction for performing a responder out-of-band action to acquire an initiator public key from the initiator device.

The devices are arranged for wireless communication according to a communication protocol between the initiator device and the responder device. The devices are arranged for executing an authentication protocol for accommodating an authentication being one of one-sided authentication of the responder device by the initiator device and mutual authentication of the responder device by the initiator device and of the initiator device by the responder device, an example being detailed below with reference to FIG. 2. The communication protocol may include the authentication protocol. In the examples the communication protocol is Wi-Fi according to IEEE 802.11 [ref 1], but other wireless protocols may also be used, such as Bluetooth, when provided with an appropriate authentication protocol based on the system as elucidated below.

The initiator processor 112 has an initiator message unit 116 to compose messages to be sent to the responder device and to decompose messages received from the responder device according to the authentication protocol. The initiator processor also has an initiator state machine 117 to provide initiator states according to the authentication protocol in dependence on user interaction and messages received from the responder device, an example being detailed below with reference to FIG. 3.

The responder processor 122 has a responder message unit 126 to compose messages to be sent to the initiator device and to decompose messages received from the initiator device according to the authentication protocol. The responder processor also has a responder state machine 127 to provide responder states according to the authentication protocol in dependence on user interaction and messages received from the initiator device.

The function of the initiator processor and the responder processor for accommodating the authentication protocol based on respective messages and respective initiator and responder states, using the respective message units and state machines, is elucidated below with reference to FIGS. 2, 3 and 4.

For the authentication, the proposed system may use any form of public key cryptography, such as RSA, see [7], or Elliptic Curve Cryptography (ECC), see [8].

Figure 2:
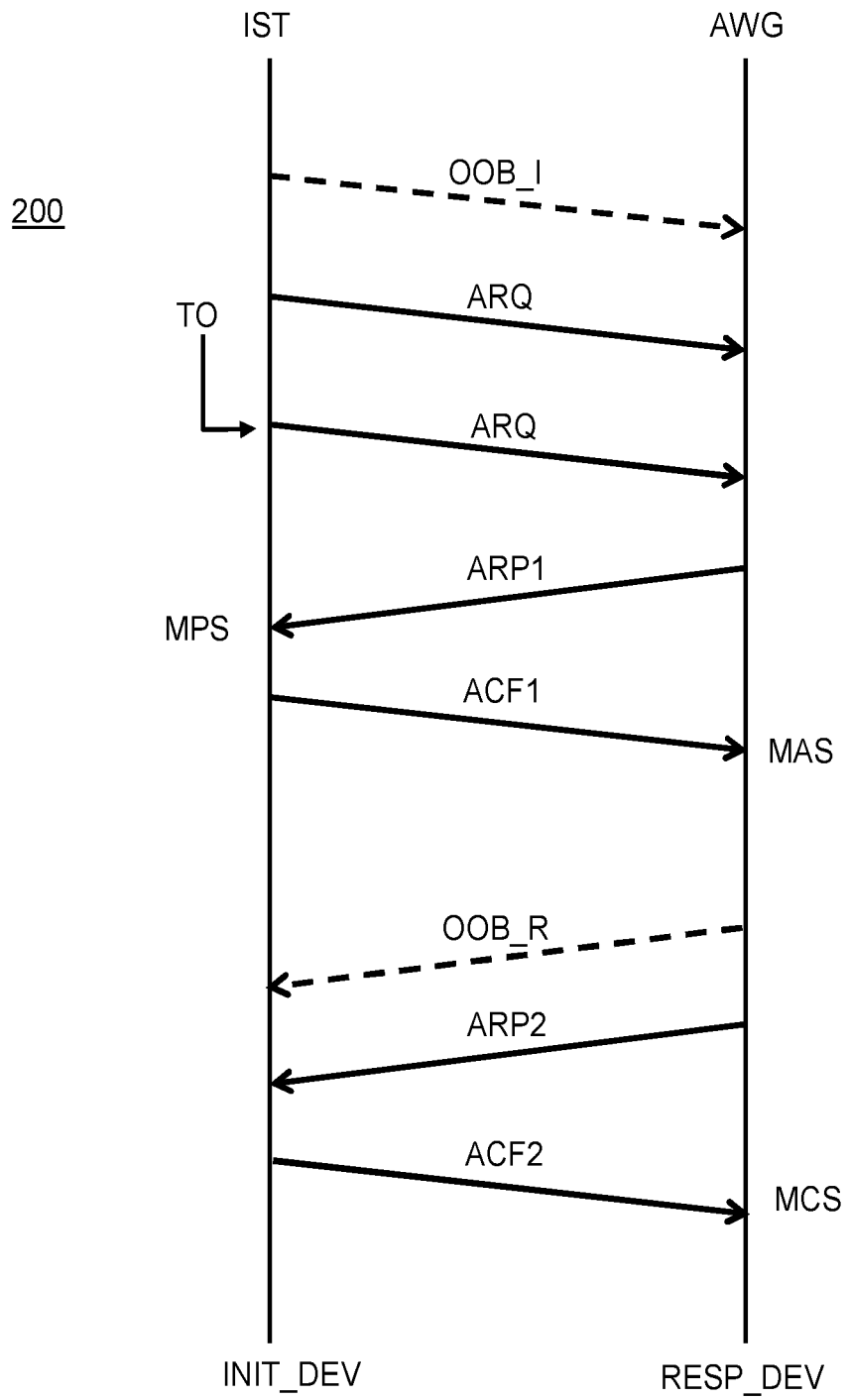
FIG. 2 shows a schematic diagram of an authentication protocol.

FIG. 2 shows a schematic diagram of an authentication protocol. According to the authentication protocol 200 a first device INIT_DEV exchanges messages with a second device RESP_DEV as indicated by arrows between two vertical timelines representing the progress of time in downward direction. The first device may be the initiator device starting at IST and the second device may be the responder device starting at AWG, but such roles may be reversed. The messages are composed by the message unit at the sending side, and decomposed by the message unit at the receiving side.

In this description, $B_I$ indicates a public bootstrapping key of the initiator, while $b_I$ indicates the corresponding private key. Similarly, $B_R$ indicates a public bootstrapping key of the responder, while $b_R$ indicates the corresponding private key. H indicates a hash function, e.g. based on an appropriate hash one-way algorithm known as such. Suitable examples of hash functions can be found in ref [4].

The hashed value of the initiator public key is indicated by $H(B_I)$. A hashed value can be easily verified to correspond to a hash-protected value, but manipulating such value while maintaining the same hash is virtually impossible. Authentication data is calculated based on one or more keys, respective public keys and private keys, for example indicated by $\{auth1\}_{k1}$, which means the value of auth1 encrypted by key k1, while $\{auth1\}$ means the value of auth1. Such keys are generated, used for encoding and decoding, producing signatures or control values, and verifying such values, as is well-known as such, e.g. from the Diffie-Hellman encryption system mentioned earlier.

Initially the initiator device may perform bootstrapping by acquiring a responder public key from the responder device via an initiator out-of-band action. The OOB action is shown by dashed arrow marked OOB action (correspondingly indicated in FIG. 1 by arrow 140). Various examples of OOB actions are described in ref [2]; chapter 10. Other examples are the user reading a code on the initiator device and entering it in the responder device, the user taking a picture with the camera of the initiator device of a machine-readable code such as a barcode or a QR code that is printed on or displayed by the responder device.

Subsequently, the initiator message unit may compose an authentication request ARQ to be sent in a bootstrapped state. The authentication request may contain an initiator verifier $H(B_I)$ for verifying an initiator public key and a responder verifier $H(B_R)$ for verifying the responder public key. The ARQ may further contain an initiator public key $P_I$, and further initiator data like an initiator nonce I-nonce, and initiator capability data I-capabilities, which may be encoded using a first key $K_1$ indicated by $\{I\text{-nonce}|I\text{-capabilities}\}_{K1}$. The first key $K_1$ may be derived by the Initiator in Diffie-Hellman fashion from the responder public key $B_R$ and the initiator private key $p_I$ corresponding to the initiator public key $P_I$. The first key $K_1$ may be derived by the Responder in Diffie-Hellman fashion from the initiator public key $P_I$ and the responder private key $b_R$ corresponding to the responder public key $B_R$. Correspondingly, the responder message unit is arranged to decompose the authentication request ARQ.

After a timeout TO, when no response is received, the ARQ may be transmitted again, e.g. up to 3 times. It is assumed that a response ARP1 is received in time.

The responder message unit is arranged to compose the authentication response ARP1, which may contain one-sided responder authentication data $\{R\text{-auth1}\}_{k1}$. The ARP1 may further contain a responder public key $P_R$, and further responder data like a responder nonce R-nonce. The first intermediate key $k_1$ may be based on an initiator public key $P_I$, on a responder private key $(P_R)$ corresponding to the responder public key $(P_R)$ (if Pr was present in ARP1) and on a responder private key $(b_R)$ corresponding to the responder public key $(B_R)$. The first intermediate key is suited for one-sided authentication of the responder device. The value of R-auth1 may be (a hash of) the concatenation of any selection of values used in the authentication protocol, such as the initiator nonce I-nonce, a responder nonce R-nonce and/or the public keys used such as $P_R$, $B_R$ and $P_I$. Due to the randomness of the nonces, the value of R-auth1 is different each time the protocol is run, thereby protecting against a replay attack. In the event of mutual authentication ARP1 may also include a mutual progress status indicative of the mutual authentication being in progress, for enabling the responder device to acquire the initiator public key from the initiator device via a responder out-of-band action. Correspondingly, the initiator message unit is arranged to decompose the authentication response ARP1.

Optionally, the initiator message unit is arranged to compose, upon receiving the mutual progress status in the authenticating state, an awaiting authentication confirm ACF1 containing a mutual awaiting status. The ACF1 may contain one-sided initiator authentication data $\{I\text{-auth1}\}_{k1}$ based on the responder public key $(B_R)$ and an initiator private key $(p_I)$ corresponding to the initiator public key $P_I$. The value of $\{I\text{-auth1}\}$ is computed in similar fashion as $\{R\text{-auth1}\}$ using the same inputs. However, the value of $\{I\text{-auth1}\}$ should be different from the value of $\{R\text{-auth1}\}$, in order to defend against a replay attack. Therefore, the order of the inputs when computing the hash should be chosen differently and or a different constant value should be included in the hash than in the computation of the hash for $\{R\text{-auth1}\}$. Correspondingly, the responder message unit may be arranged to decompose the awaiting authentication confirm ACF1.

Subsequently the responder device may perform or has already performed acquiring an initiator public key from the initiator device via a responder out-of-band action. The OOB action is shown by dashed arrow marked OOB action (correspondingly indicated in FIG. 1 by arrow 140). Upon completing said acquiring, the responder state machine proceeds as elucidated below for sending a mutual authentication response ARP2.

The responder message unit is arranged to compose the mutual authentication response ARP2 comprising mutual responder authentication data $\{R\text{-auth2}\}_{k2}$. The ARP2 may further contain a responder public key $P_R$, and further responder data like a responder nonce R-nonce. The second intermediate key $k_2$ may be based on the initiator public key $(B_I)$ and a responder private key $(b_R)$ corresponding to the responder public key $(B_R)$. The second intermediate key is suited for mutual authentication of the responder device and the initiator device. The second intermediate key may be determined using $\{b_R, P_R, B_I \text{ and } P_I\}$ in the responder or $\{p_I, b_I, B_R, \text{ and } P_R\}$ in de initiator. The value of R-auth2 may be a hash of the concatenation of values used in the authentication protocol, such as the initiator nonce I-nonce, a responder nonce R-nonce and the public keys used such as $B_I$, $B_R$, $P_R$ and $P_I$. Due to the randomness of the nonces, the value of $\{R\text{-auth2}\}$ is different each time the protocol is run, thereby protecting against a replay attack. Correspondingly, the initiator message unit is arranged to decompose the authentication response ARP2. Successfully processing means that the Initiator processor arrives at the same value for $k_2$ as the Responder, and that the Initiator finds the same value for $\{R\text{-auth2}\}$ by computing R-auth2 itself and by decryption with the key $k_2$ of the value $\{R\text{-auth2}\}_{k2}$ received in the message ARP2.

The initiator message unit is arranged to compose a mutual authentication confirm ACF2 comprising a mutual confirm status indicating confirmation of the mutual authentication and mutual initiator authentication data $\{I\text{-auth2}\}_{k2}$ based on the responder public key $(B_R)$ and an initiator private key $(b_I)$ corresponding to the initiator public key $(B_I)$. The second intermediate key $k_2$ can be determined using $\{p_I, b_I, B_R, \text{ and } P_R\}$ in the initiator. The value of $\{I\text{-auth2}\}$ is computed in similar fashion as $\{R\text{-auth2}\}$ using the same inputs. However, the value of $\{I\text{-auth2}\}$ should be different from the value of $\{R\text{-auth2}\}$, in order to defend against a replay attack. Therefore, the order of the inputs when computing the hash should be chosen differently and or a different constant value should be included in the hash than in the computation of the hash for $\{R\text{-auth2}\}$. Correspondingly, the responder message unit is arranged to decompose the mutual authentication confirm ACF2. If the Responder arrives at the same intermediate key $k_2$ and obtains the same value for data I-auth2 by computing I-auth2 itself and by decryption of the received $\{I\text{-auth2}\}_{k2}$ with key k2, then the Responder did authenticate $B_I$ and the processing of the mutual initiator authentication data $\{I\text{-auth2}\}_{k2}$ was successful.

Figure 3:
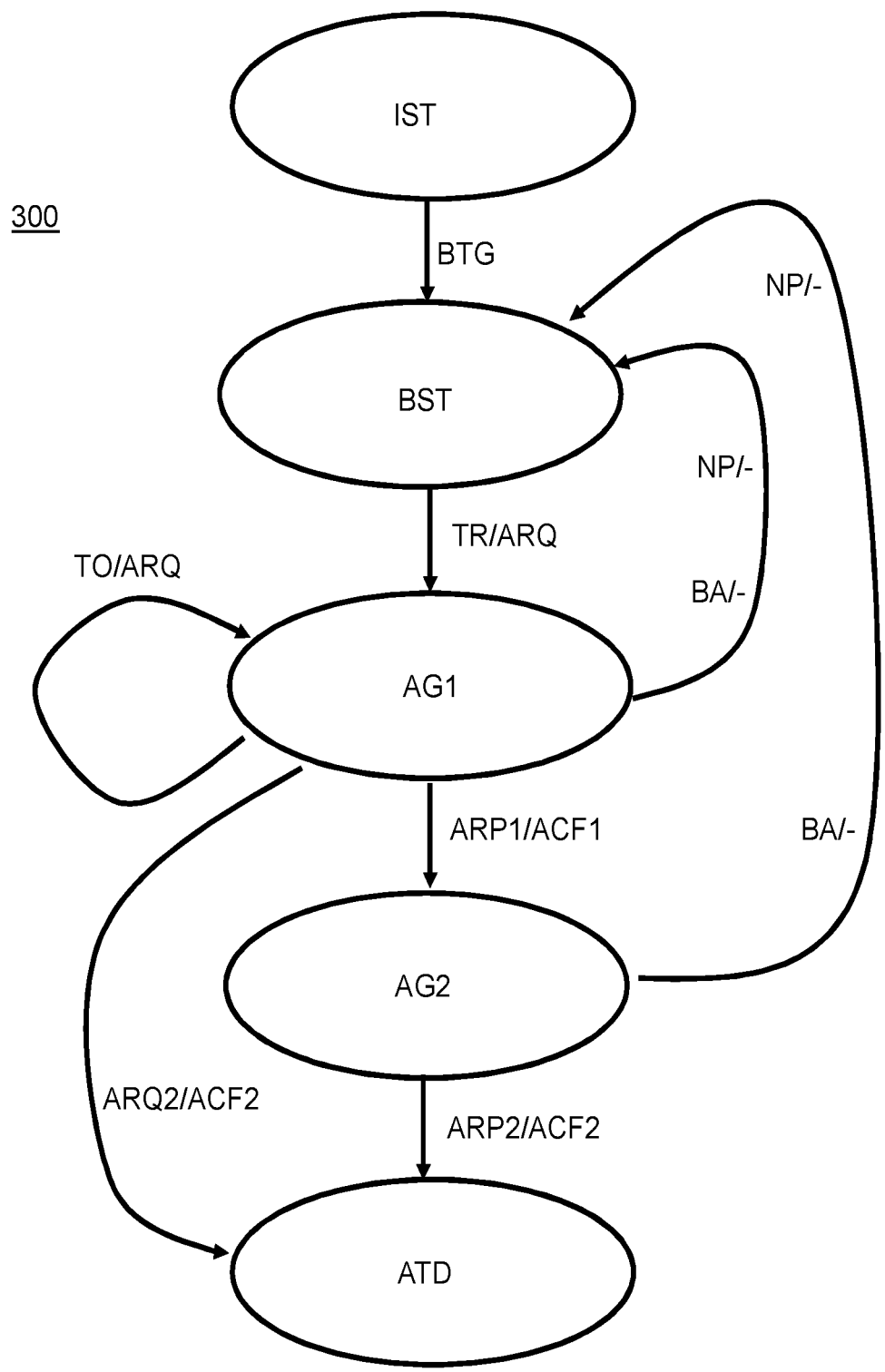
FIG. 3 shows an example of an initiator state machine.

FIG. 3 shows an example of an initiator state machine. The initiator state machine 300 provides the initiator states according to the authentication protocol in dependence on user interaction and messages received from the responder device. The initiator states may include an initial state IST for bootstrapping by acquiring a responder public key from the responder device via an initiator out-of-band action;

a bootstrapped state BST indicating that the bootstrapping has been successfully performed by acquiring the responder public key;

an authenticating state AG1 for performing the authentication;

an mutual authenticating state AG2 for performing the mutual authentication;

an authenticated state ATD indicating that the authentication has been successfully performed.

Initially the state machine starts at the starting state IST. Arrows indicate state transitions, and are marked by an acronym indicating the message or event corresponding to the state transition. The initiator state machine is arranged to engage the bootstrapped state BST upon successfully performing the bootstrapping BTG by acquiring the responder public key.

The initiator state machine may be arranged to subsequently engage the authenticating state AG1 upon sending the ARQ, and/or via a trigger event TR by the user or another event, or immediately after said successful bootstrapping. After a time-out TO, the state may be re-engaged after retransmitting the ARQ, while counting the number of trials and after exceeding a predetermined number of trials, fall back to the bootstrapped state BST, or to the initial state IST. The states BST and AG1 may also be combined.

The initiator state machine is arranged to engage the mutual authenticating state AG2, upon receiving the mutual progress status in ARP1, for awaiting mutual authentication. Optionally, the awaiting authentication confirm ACF1 may be sent containing the mutual awaiting status.

The initiator state machine is arranged to engage the authenticated state ATD upon receiving the mutual authentication response ARP2 and the initiator processor successfully processing the mutual responder authentication data $\{R\text{-auth2}\}_{k2}$ based on the responder public key and an initiator private key ($b_I$) corresponding to the initiator public key ($B_I$). Then also the mutual authentication confirm ACF2 may be sent comprising the mutual confirm status.

Optionally, the initiator state machine is arranged to engage the authenticated state, upon receiving the mutual authentication response ACF2 in the authenticating state AG1 and the initiator processor successfully processing the mutual responder authentication data $\{R\text{-auth2}\}_{k2}$. Then also the mutual authentication confirm ACF2 may be sent comprising the mutual confirm status. So effectively the mutual authenticating state is skipped.

Optionally, the initiator message unit is arranged to decompose, in the event of the one-sided authentication, a one-sided authentication response (ARP1) comprising one-sided responder authentication data $\{R\text{-auth1}\}_{k1}$ based on a responder private key $b_R$ corresponding to the responder public key $B_R$ and a one-sided status indicative of the one-sided authentication. Also, the initiator state machine is arranged to engage the authenticated state upon the initiator processor successfully processing the one-sided responder authentication data $\{R\text{-auth1}\}_{k1}$ based on the responder public key and an initiator private key $b_I$ corresponding to the initiator public key $B_I$. Successfully processing means that the initiator processor arrives at the same value for k1 as the responder, and that the initiator finds the same value for $\{R\text{-auth1}\}$ by computing R-auth1 itself and by decryption with the key k1 of the value $\{R\text{-auth1}\}_{k1}$ received in the message ARP1.

Optionally, the initiator state machine is arranged to engage the bootstrapped state or the initial state, upon receiving the authentication response ARP1 and the initiator processor unsuccessfully processing the one-sided responder authentication data $\{R\text{-auth1}\}_{k1}$. The unsuccessfully processing may be due to a so-called bad authentication BA, or when no peer device is found NP. In such cases the initiator state machine may be arranged to fall back to the bootstrapped state BST, or to the initial state IST, which may further depend on the event as detected.

Optionally, the initiator state machine is arranged to engage the bootstrapped state or the initial state, upon receiving the mutual authentication response ARP2 and the initiator processor unsuccessfully processing the mutual responder authentication data $\{R\text{-auth2}\}_{k2}$. The unsuccessfully processing may be due to a so-called bad authentication BA, or when no peer device is found NP. In such cases the initiator state machine may be arranged to fall back to the bootstrapped state BST, or to the initial state IST (not shown), which may further depend on the event as detected.

Figure 4:
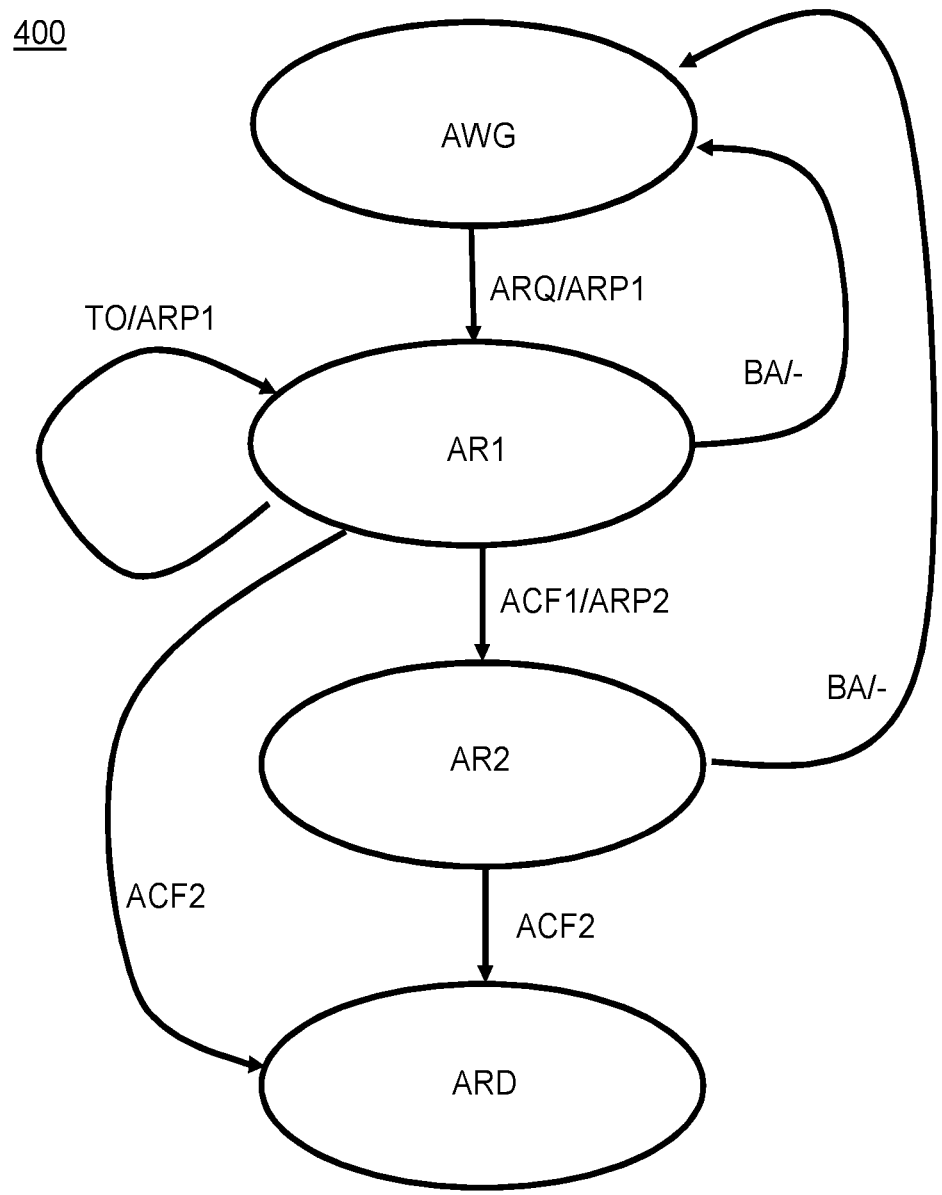
FIG. 4 shows an example of a responder state machine.

FIG. 4 shows an example of a responder state machine. The responder state machine 400 provides responder states according to the authentication protocol in dependence on user interaction and messages received from the initiator device. The responder states may comprise an awaiting state (AWG) for receiving messages from the initiator;

a responder authenticating state (AR1) for performing the authentication;

a mutual responder authenticating state (AR2) for enabling the responder device to acquire an initiator public key from the initiator device via a responder out-of-band action;

a responder authenticated state (ARD) indicating that the authentication has been successfully performed.

Initially the responder state machine starts at the awaiting state AWG. The state may be engaged upon a user interaction, or any other event such as switching on the responder device. Arrows indicate state transitions, and are marked by an acronym indicating the message or event corresponding to the state transition.

The responder state machine may be arranged to engage the responder authenticating state AR1 upon receiving and successfully processing the authentication request ARQ. The states AWG and AR1 may also be combined to a single state.

Unsuccessfully processing ARQ may mean that the responder determined that the responder verifier $H(B_R)$ in the received ARQ is not the hash of its public key $B_R$ or that decrypting the $\{I\text{-nonce}\|I\text{ capabilities}\}_{k1}$ in the received ARQ leads to an error. An example of an encryption/decryption algorithm that is able to detect during decryption that a wrong key is used for decryption or that the encrypted data has been changed after encryption is AES-SIV, see [3]. Upon successful processing ARQ, the authentication response ARP1 containing the mutual progress status indicative of the mutual authentication being in progress, is transmitted to the initiator.

The responder state machine provides and engages a mutual responder authenticating state AR2 upon the responder device acquiring an initiator public key from the initiator device via a responder out-of-band action. Upon said acquiring also the mutual authentication response ARP2 is sent to the initiator.

Optionally, the responder state machine is arranged to receive and process the awaiting mutual authentication confirm ACF1 comprising a mutual awaiting status. The responder state machine is then arranged to only engage the mutual responder authenticating state AR2 upon receiving the mutual awaiting status and said responder OOB action. If ACF1 is not received within a predetermined timeout TO the state remains the responder authenticating state ART, and the ARP1 may be transmitted again up to a predetermined number of re-tries.

The responder state machine is arranged to engage the responder authenticated state ARD upon receiving the mutual authentication confirm ACF2 and upon the responder processor successfully processing the mutual initiator authentication data $\{\text{I-auth2}\}_{k2}$ based on the initiator public key $B_I$ and the responder private key $b_R$.

Optionally, the responder state machine is arranged to engage the responder authenticated state ARD upon receiving the mutual authentication confirm ACF2 in the responder authenticating state ART and upon the responder processor successfully processing the mutual initiator authentication data $\{\text{I-auth2}\}_{k2}$. Receiving ACF2 may occur upon the responder directly, upon receiving the ARQ, sending the mutual authentication response ARP2 to the initiator, for example based on the responder already possessing the initiator public key from an earlier session.

Optionally, message unit is arranged to compose, in the event of the one-sided authentication, a one-sided authentication response ARP1 comprising one-sided responder authentication data $\{\text{R-auth1}\}_{k1}$ based on a responder private key $b_R$ corresponding to the responder public key $B_R$ and a one-sided status indicative of the one-sided authentication being complete. Also, the responder state machine is arranged to, in the event of the one-sided authentication, engage the responder authenticated state upon receiving a one-sided authentication confirm ACF1 and the responder processor successfully processing one-sided initiator authentication data $\{\text{I-auth1}\}_{k1}$. Successfully processing means that the responder processor arrives at the same value for $k_1$ as the initiator, and that the responder device finds the same value for I-auth1 by computing I-auth1 itself and by decryption with the key $k_1$ of the value $\{\text{I-auth1}\}_{k1}$ received in the message ACF1.

Optionally, the responder state machine is arranged to engage the awaiting state upon receiving the mutual authentication confirm ACF2 and the responder processor unsuccessfully processing the mutual initiator authentication data $\{\text{I-auth2}\}_{k2}$, resulting in a bad authentication event BA.

Optionally, the responder message unit arranged to further decompose the awaiting authentication confirm ACF1 comprising one-sided initiator authentication data $\{\text{I-auth1}\}_{k1}$ and comprising a mutual awaiting status. And the responder state machine is arranged to engage the awaiting state upon the responder processor unsuccessfully processing the one-sided initiator authentication data, resulting in a bad authentication event BA.

In general mutual authentication can be accommodated in an authentication protocol that also specifies one-way authentication. In one-way authentication, the (user of) the responder does not wish to make certain from which device it has received the Authentication Request. The responder does not capture a public key $B_I$ of the Initiator out-of-band and consequently cannot and does not send a hash of $B_I$ in the Authentication response message to the initiator. Only one-sided authentication is done when the responder proves possession to the initiator of the private key $b_R$ that corresponds to the public key $B_R$ that the Initiator has captured out of band. For example, by using $b_R$ in Diffie-Hellman fashion, see ref [6], to create a key for encrypting a message to the initiator. Such a protocol may use two or more key-pairs for each party, e.g. one key pair for bootstrapping the trust in each other and a further key pair from which a public key gets authenticated for further operations.

When a user performs an action that triggers the execution of a protocol with requests and responses over Wi-Fi and further exchanges of messages, the user does not like to be waiting long before this action with all its exchanges is finished. However, each of the messages may fail to be received by the other party for a number of reasons, for example if a message is corrupted by RF interference. So, when a device sends a request over Wi-Fi, it sets a timer to wait for the response. If the response does not arrive within a time-out, it may try sending the request again. If no response has been received after a number of tries, the device gives up and reports this to the user. The chances of success are increased when the wait time is longer and number of allowed tries is more, but the user also has to wait longer before getting confirmation that the protocol did not succeed.

A problem with traditional mutual authentication is that it may take longer for the responder to respond with an Authentication Response message for mutual authentication than in the event of one-way authentication, because the user of the responder device has to capture the public key BI first. Also, the initiator device does not know whether the responder device wants to do mutual authentication or not. Therefore, it must set its wait time and number of tries high to accommodate for this. This would mean that in the case there is a Wi-Fi problem, e.g. too much noise or some other reason for bad Wi-Fi transfers between initiator and responder, the initiator device must wait very long before giving up and reporting this to its user.

The proposed system is effective when there is user interaction required to capture the public OOB key $B_I$ of the initiator. Examples of such a responder OOB action are when $B_I$ is displayed as a machine-readable code (e.g. QR code or barcode) and the user has to use a machine-readable code reader (such as a camera or a laser scanner) to read $B_I$;

when $B_I$ is displayed in human readable form and the user has to enter a code in the Responder device using some input device (keyboard, keys, touch display with keyboard displayed on it, mouse and keyboard displayed on screen, etc.);

when $B_I$ is transferred using an NFC tag, see ref [5], that the user has to bring in contact with an NFC reader for the responder device, where the NFC tag with $B_I$ cannot be used to transfer $B_R$ to the Initiator device, simultaneously with transferring $B_I$ to the responder device.

For resolving the above issues, in case the responder wants to do mutual authentication, it first creates a first Authentication Response as if it wants to do one-way authentication. It performs all cryptographic and other actions as if it wants to do one-way authentication. However, it indicates in its response that it wants to do mutual authentication later on. This indication may be a special status, e.g. instead of "STATUS OK", it may send a status "MUTUAL AUTHENTICATION IN PROGRESS" in the Authentication Response.

When receiving such ARP, the initiator device will get a quick response to its Authentication Request when there are no Wi-Fi problems. The Initiator device may perform one-way authentication checks for the responder the responder device for building trust in the responder device. Doing the one-way authentication checks, e.g. performing an integrity check on the returned status using a Diffie-Hellman key, also prevents attackers to change the status code "MUTUAL AUTHENTICATION IN PROGRESS" or other parts of the Authentication response message.

The Initiator device may, after having found no problems with all the cryptographic checks on the received Authentication response, respond with an Authentication Confirm message with a special status "AWAITING MUTUAL AUTHENTICATION RESPONSE".

The (user of) the Responder device may then capture the public key $B_I$ at leisure and when done, respond with a mutual authentication response containing the hash of the public key $B_I$ of the Initiator and a further status "STATUS OK".

Now a detailed authentication protocol will be described. The protocol enables public keys to be used out-of-band (OOB), which are displayed or transferred in full but are not used as such over Wi-Fi. Instead, over Wi-Fi, hash values of the public OOB keys are used, so that these public keys remain unknown to others listening to the exchanged Wi-Fi messages. This is useful in case the OOB keys are static. Static OOB keys may be used by devices that do not have a means of outputting data OOB, such as a display for a QR code. When the protocol requires the Responder to receive a public key in-band, so over Wi-Fi, the Initiator may send a further, different public key $P_I$ over Wi-Fi.

For the transfer of public keys alternative embodiments are possible. Instead of using the hash of a public key over Wi-Fi, other ways to obfuscate a value may be used, such as only displaying/sending a limited number of bits of the public key. Also, instead of the full value, a hash of the public keys may be displayed/transferred OOB. This has as the advantage that the number of bits to display or transfer OOB can be less, so smaller QR codes or smaller NFC tags, see ref [5], can be used. In such a case, the full value of the public keys has to be sent in-band, i.e. over Wi-Fi. In this case, $P_I$ and $B_I$ may be the same. The public keys may both be displayed/transferred in full using OOB and over Wi-Fi.

In the example protocol described now, the OOB public keys are displayed as a QR code and captured by a camera, but other embodiments for the OOB channel are also possible, see the examples above.

In a first stage, the user of the initiator device wants to set-up a secure connection between the initiator device and a specific the responder device. The user starts the Authentication protocol on the initiator device. The initiator device uses public key pairs $B_I/b_I$ and $P_I/p_I$ or generates new key pairs $B_I/b_I$ and $P_I/p_I$.

In certain embodiments, the responder device may be actively set in a responder mode. In other embodiments, the responder device is set in Responder mode when it is switched on for the first time or after a reset to factory values. Setting R to Responder mode may trigger generating a new public key pair $B_R/b_R$. The responder device has to be in Responder mode in order to participate in the protocol. In the Responder mode, the responder device may display a public key $B_R$ for use as the public key or one of the public keys in Diffie-Hellman. $B_R$ may be static and printed on the responder device or in its manual. The private key corresponding to $B_R$ is $b_R$. The pair $B_R/b_R$ may be generated anew for each new execution of Diffie-Hellman or for every time interval of x minutes. The display of $B_R$ can be in human-readable form or in machine readable form (QR code, barcode) or both. We'll assume a computer readable code here that can be read with a camera.

In a second stage, the user of the initiator device initiates the Authentication protocol and points the camera of the initiator device to the machine readable public key $B_R$ of the responder device and makes the initiator device to capture it. These user actions may take some time of course.

In a third stage, the initiator device sends an Authentication Request to the responder device over Wi-Fi, by addressing the responder device directly if the initiator device knows the MAC address or by broadcasting it over Wi-Fi. The Authentication Request contains the hash of the public key $B_I$ of the initiator device and a hash of the public key $B_R$ of the responder device, the public key $P_I$ of the Initiator to be used in deriving a Diffie-Hellman key by the Responder and other Initiator information, e.g. an Initiator Nonce, encrypted with a key k1 that is derived using Diffie-Hellman using $B_R$ and $p_I$. Encryption can be done with a symmetric cipher. However, when a cipher is used that also features integrity checking of its encrypted payload and also integrity checking of other, unencrypted parts of its payload, e.g. AES-SIV (see ref [3]), the responder device can check during decryption of the "other Initiator information" whether it has generated the correct Diffie-Hellman key and whether unencrypted values in the message, such as a status code, have not been changed by an attacker. If AES-SIV decrypts without errors, the responder device knows for certain that the initiator device has used the private key corresponding to $P_I$, so the Initiator device has proven the possession of the private key corresponding to $P_I$ to the Responder device.

In a next stage, the responder sees a Wi-Fi message with the hash of its public key $B_R$, so it knows it is meant for it. It also knows that the sender of this message has captured $B_R$ from its display, especially when $B_R$ was generated anew just before this execution of the Authentication protocol. However, the responder device has no clue of which device the sender is. Therefore, (the user of) the responder device may want further authentication, and thereto capture out of band the public key $B_I$ of the initiator device. The user of the responder device may set up his device to perform mutual authentication. The responder now provides a quick feedback to the Initiator device, so the Initiator device knows that the Wi-Fi link is working, and that cryptographically all is OK for now. The response message indicates that a mutual authentication response will come from the responder device, but that this response may take some time (in the order of seconds to tens of seconds). So, the Responder immediately replies with an Authentication Response message to the Initiator with status "MUTUAL AUTHENTICATION IN PROGRESS", while further data in the message is generated as in a one-way authentication response. The latter means that, in the construction of this message, the "other Initiator information", e.g. the Initiator Nonce, from the Authentication Request is decrypted by the Responder device using $P_I$ and $b_R$ and used in the construction of the Authentication Response message, so that the Initiator can check whether the responder has indeed used the correct "other Initiator information", e.g. the Initiator Nonce and so proved possession of the private key $b_R$ that corresponds to the Responder OOB public key $B_R$.

Various ways to use the other Initiator information in the construction of the Authentication response message include the following.

The "other Initiator information" can be put in the clear in the message.

The "other Initiator information" can be put in the clear in the message, while being protected for integrity by a key that is derived using Diffie-Hellman, e.g. by using the "other Initiator information" as AAD (Authenticated Associated Data, or Authenticated Additional Data) with AES-SIV.

The "other Initiator information" can be used to derive a further key, e.g. by first deriving a key using Diffie-Hellman and using the Diffie-Hellman key and the "other Initiator information" as input for a key derivation function. If the so derived key is used with AES-SIV, or if the so derived key is used to encrypt something that is known to the Initiator, the Initiator can check whether the Responder knows the correct "other Initiator information". Optionally, the status field may also be used as AAD for AES-SIV, so it cannot be tampered with without the Initiator device finding out about this.

In a next stage, the Initiator receives the Authentication Response message. It performs all cryptographic checks and can find out whether the Responder device has correctly decrypted the "other Initiator information", and so whether the responder device possesses the private key $b_R$ that corresponds to the public OOB key $B_R$ that the Initiator device has captured with its camera from the responder device. If these check fail, the Initiator device aborts the protocol. If the checks turn out OK, the Initiator device inspects the status field. It will see "MUTUAL AUTHENTICATION IN PROGRESS". The Initiator device now knows that it has to wait for several seconds to several tens of seconds for a second response from the Responder device.

Optionally, the Initiator device confirms the correct reception of the Authentication Response message with an Awaiting Authentication Confirm message with a status indicating that the Initiator is waiting for the mutual Authentication Response. The message may be constructed for one-way authentication.

In a next stage, the user of the responder device points the camera of the responder device to the public key $B_I$ displayed by the initiator device. When the hash of the so captured public key from the initiator device matches the hash of the public key of the initiator device received over Wi-Fi in the Authentication Request message, the responder device can be certain that it is going to use the correct public key for performing Diffie-Hellman with the initiator device. The responder device will know for certain that it is communicating with the device it captured $B_I$ from when later on in the protocol, the initiator device proves possession of the corresponding private key $b_I$.

In a next stage, after having captured the public key BI, the responder device responds to the initiator device with a mutual authentication response message, composed as a mutual authentication response. The message may contain a status "mutual OK", or simply "OK", the hash of $B_I$ and other Responder information encrypted with keys that are derived using Diffie-Hellman using public keys $P_I$ received over Wi-Fi in the Authentication Request message and $B_I$ obtained out-of-band from the initiator device. The "other Initiator information" sent by the Initiator device is decrypted by the responder device, using its private key $b_R$ and the received public key $P_I$, and used in the construction of the Authentication Response message, as described before, so the responder device can prove possession of $b_R$ to the initiator device. Some differences with the one-way Authentication Response are that the Responder uses also $B_I$ to derive a Diffie-Hellman key from and the presence of the hash of $B_I$ in the response.

There are different ways in which the Responder device can use the two public keys $B_I$ and $P_I$ from the Initiator. For example, the responder may use each of these two public keys together with one or two private keys of its own to derive two Diffie-Hellman key with, k3 and k4.

In a first embodiment, the responder can e.g. derive k3 using $P_I$ and its private key $b_R$ or a new private key $p_R$ or the sum of $b_R$ and $P_R$. In case it uses $P_R$, it has to include the corresponding public key $P_R$ in the Authentication response in such a way that the Initiator can retrieve it. That can be done by sending $P_R$ in-the-clear or encrypted with a key that the Initiator is able to derive, e.g. key k1 above.

In a second embodiment, the responder may e.g. derive k4 using $B_I$ and its private key $b_R$ or a new private key $P_R$ or the sum of $b_R$ and $P_R$. In case it uses $P_R$, it has to include the corresponding public key $P_R$ in the Authentication response in such a way that the Initiator can retrieve it. That can be done by sending $P_R$ in-the-clear or encrypted with a key that the Initiator is able to derive, e.g. key k1 above. In case the sum of the two private keys is used for either k3 or k4, the derivation of the other keys should not use the sum of $p_R$ and $b_R$, but just one of these keys. This way, the responder device is able to prove possession of the private keys instead of only the sum of the private keys $b_R$ and $P_R$.

In a further embodiment, the responder may use both keys k3 and k4 to each encrypt a different value that the Initiator knows, e.g. the Initiator nonce, so the Initiator can check whether the responder device knows the private keys the Responder used. In addition, the responder encrypts its own "other Responder information", e.g. a Responder Nonce, for being able to check the Authentication Confirm message.

In a further embodiment, instead of using the keys k3 and k4 to encrypt different values, one of them, the "first one", can be used to encrypt a first value while the other key, the "second key" is used to encrypt the concatenation of another value and the encrypted first value. The second key should be such that the Responder can generate this key. The values encrypted with the second key may contain information required to generate the first key, so helping build trust.

In a next stage, the initiator receives the Authentication Response message, now with status "OK". The initiator device compares the hash in there with the hash of its public key $B_I$. When that matches, the initiator device also knows that the Responder the responder device has captured its public key $B_I$ from its display. The initiator device generates all the required keys, for which it needs its private key $b_I$ and $p_I$, performs all the cryptographic checks. If these checks are all OK, the Initiator device knows that it has been communicating with the device that possesses the private key $b_R$ and possibly $P_R$, if the latter has also been used and that the Responder device has successfully obtained the correct $B_I$.

In a next stage, if the checks in the previous stage are all OK, the initiator device sends a Confirmation Response message to the responder device with status "OK", where among other things a key is used that is derived in Diffie-Hellman fashion from $b_I$, so that the initiator device can prove possession of $b_I$ to the responder device. The initiator device also uses the "other Responder information", e.g. the Responder Nonce, so that the Responder can see that the Initiator was successful in decrypting these.

The above system may be implemented in portable devices, lap tops, PCs, Wi-Fi access points, Wi-Fi peer-to-peer devices, Bluetooth devices, ZigBee devices. In case Wi-Fi is used, the invention is typically implemented in the wpa_supplicant software see e.g. https://en.wikipedia.org/wiki/wpa_supplicant.

In an embodiment, the authentication protocol between a first and a second device comprises an additional attribute or additional message that may for example be added to the authentication protocol as defined in IEEE 802.11, see ref [1], containing a credential (e.g. public key) or a hash of a credential or an encrypted credential. The second device has to include such credential or hash of a credential or an encrypted credential as part of the message exchange for the authentication protocol. To be symmetric, also the first device would have to include such credential, hash of a credential or encrypted credential. The preferred field containing the credential or hash of a credential or an encrypted credential in a message of the authentication protocol is a field of which the signal or at least part of the signal transferring that field is used to measure the transmit or arrival time of the message, so that it is very difficult if not impossible for another device to insert its credential or hash of its credential or its encrypted credential in a message.

In one embodiment, the first message processor is arranged to process this credential or hash of a credential or encrypted credential, and verifies if it matches a credential that has previously been used by a device with which it has successfully performed device authentication and established mutual trust, such as by using the Wi-Fi Protected Setup Protocol, Device Provisioning Protocol, Diffie-Hellman key exchange and/or the 4-way WPA2 handshake, see [1]. If a match is found, the first device may assume that the second device can be trusted and deemed reliable. If no match is found, the first device will distrust the second device and perform additional steps to verify the reliability.

In an alternative embodiment, the second device has to include a credential or hash of credential or an encrypted credential that will be used during later connection setup. The first message processor is arranged to process and store the received credential or hash of credential or an encrypted credential in conjunction with other parameters of the second device, in order to securely correlate with the particular device that connects with that credential. Upon setting up the connection between the first and second device, the first device verifies if the same credential or a derivative thereof is used whilst performing the device authentication, such as during performing the Wi-Fi Protected Setup Protocol, Device Provisioning Protocol, Diffie-Hellman key exchange and/or whilst performing the 4-way WPA2 handshake. By doing so, the first device can determine that the device with which it is connecting, is the same device as for which earlier authentication was done. In particular, if the credential was a public key and if the setting up the connection between the first and second device included that the second device has successfully proved to the first device that it has possession of the private key belonging to the public key as credential, the first device can be certain that the second device is the one that it pretends to be and not an imposter.

Figure 5:
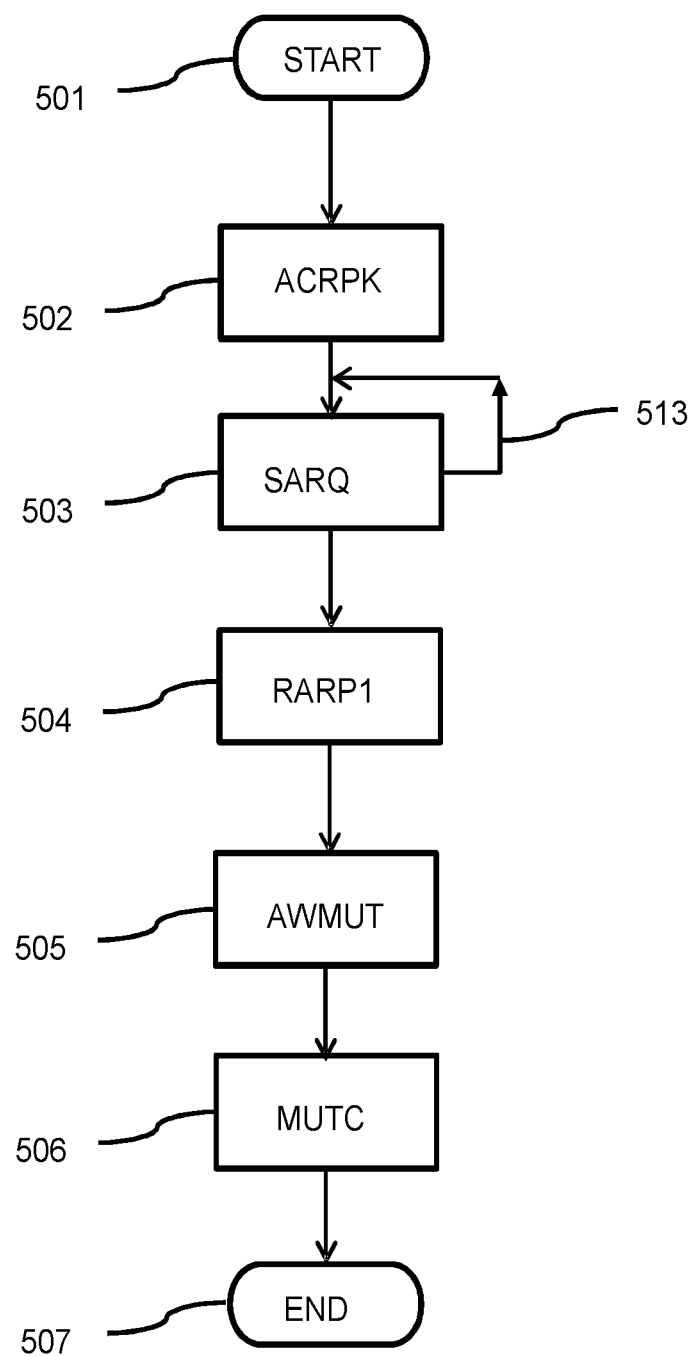
FIG. 5 shows a method for an initiator.

FIG. 5 shows a method for an initiator. The method is for use in an initiator device for wireless communication with a responder device according to a communication protocol and an authentication protocol for accommodating authentication. The protocol requires initiator states according to the authentication protocol in dependence on user interaction and messages received from the responder device.

The method starts at node START 501. In the first stage the method sets an initial state for bootstrapping.

In a next step ACRPK 502 the method engages acquiring a responder public key $B_R$ from the responder device via an initiator out-of-band action. Upon successful acquiring $B_R$ the method, in step SARQ 503, engages a bootstrapped state indicating that the bootstrapping has been successfully performed by acquiring the responder public key. Then the method continues by composing an authentication request ARQ comprising an initiator verifier (H($B_I$)) for verifying an initiator public key and a responder verifier (H($B_R$)) for verifying the responder public key. The message ARQ is sent in the bootstrapped state. Then the method awaits receiving an authentication response. If not received within a predetermined time, the method again sends the ARQ as indicated by arrow 513.

In a next stage RARP1 504, an authenticating state for performing the authentication is engaged. Subsequently, the method receives and decomposes an authentication response ARP1 comprising one sided responder authentication data {R-auth1}$_k$1 based on a responder private key $b_R$ corresponding to the responder public key $B_R$. The ARP1 has a mutual progress status indicative of the mutual authentication being in progress for enabling the responder device to acquire the initiator public key from the initiator device via a responder out-of-band action.

In a next stage AWMUT 505 a mutual authenticating state is engaged upon receiving the mutual progress status, for awaiting mutual authentication. Next, a mutual authentication response ARP2 is received and decomposed. ARP2 comprises mutual responder authentication data {R-auth2}$_{k2}$ based on the initiator public key $B_I$ and the responder private key $b_R$.

In a next stage MUTC 506 an authenticated state is engaged indicating that the authentication has been successfully performed. This involves receiving the mutual authentication response ARP2 and successfully processing the mutual responder authentication data {R-auth2}$_{k2}$ based on the responder public key and an initiator private key ($b_I$) corresponding to the initiator public key ($B_I$). Then the method continues by composing a mutual authentication confirm ACF2 comprising a mutual confirm status indicating confirmation of the mutual authentication. ACF2 also comprises mutual initiator authentication data {I-auth2}$_{k2}$ based on the responder public key $B_R$ and an initiator private key $b_I$ corresponding to the initiator public key $B_I$. The method then terminates at node END 507.

Figure 6:
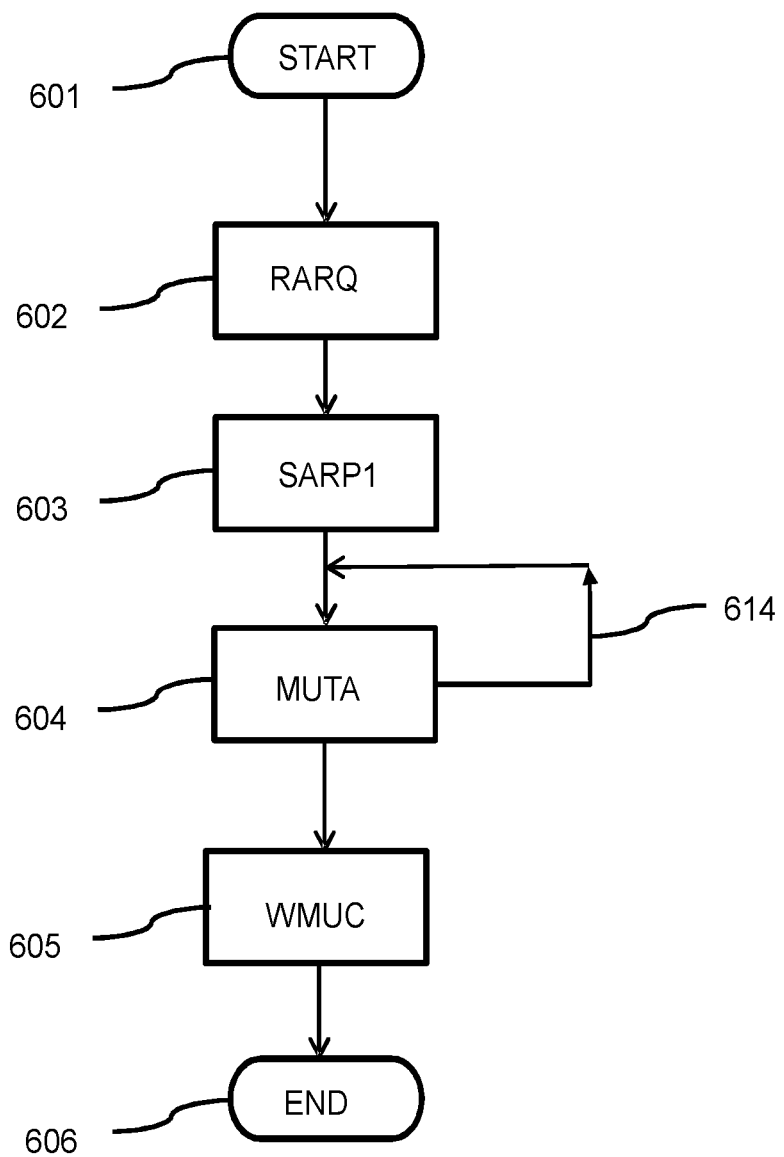
FIG. 6 shows a method for a responder.

FIG. 6 shows a method for a responder. The method is for use in a responder device for wireless communication with an initiator device according to a communication protocol and an authentication protocol for accommodating authentication. The protocol requires responder states according to the authentication protocol in dependence on user interaction and messages received from the initiator device.

The method starts at node START 601. In a first stage RARQ 602 the responder engages an awaiting state for receiving messages from the initiator. An authentication request ARQ is received and decomposed. ARQ comprises an initiator verifier H($B_I$) for verifying an initiator public key and a responder verifier H($B_R$) for verifying the responder public key.

In a next stage SARP1 603, the method engages a responder authenticating state for performing the authentication. The responder authenticating state is engaged upon successfully processing the authentication request. Then an authentication response ARP1 is composed, comprising one-sided responder authentication data {R-auth1}$_k$1 based on a responder private key $b_R$ corresponding to the responder public key $B_R$ and a mutual progress status indicative of the mutual authentication being in progress.

In a next stage MUTA 604, a mutual responder authenticating state is engaged. Now (the user of) the responder is enabled to acquire an initiator public key from the initiator device via a responder out-of-band action. This may take some time as indicated by an arrow 614 reentering the state. After successfully acquiring the initiator public key a mutual authentication response ARP2 is composed and sent in the mutual responder authenticating state. ARP2 comprises mutual responder authentication data {R-auth2}$_{k2}$ based on the initiator public key $B_I$ and a responder private key $b_R$ corresponding to the responder public key $B_R$.

In a next state WMUC 605, a responder authenticated state is engaged indicating that the authentication has been successfully performed. A mutual authentication confirm ACF2 is received and decomposed. ACF2 comprises a mutual confirm status indicating confirmation of the mutual authentication and mutual initiator authentication data $\{I\text{-auth2}\}_{k2}$ based on the responder public key $B_R$ and an initiator private key $b_I$ corresponding to the initiator public key ($B_I$). The authenticated state is engaged upon successfully processing the mutual initiator authentication data based on the initiator public key ($B_I$) and the responder private key ($b_R$). The method now terminates at node END 606.

Computer program products, downloadable from a network and/or stored on a computer-readable medium and/or microprocessor-executable medium, are provided that comprise program code instructions for implementing the above methods when executed on a computer for protecting location information, as elucidated further below.

The above system may be applied, for example, in indoor and outdoor short range wireless communication systems, where authentication is supported via an authentication protocol. For example, the system can be applied in portable devices and stationary devices supporting Wi-Fi, Wi-Fi Aware, or Wi-Fi Direct.

Typically, the initiator device and the responder device that interact, each comprise a processor which executes appropriate software stored at the devices; for example, that software may have been downloaded and/or stored in a corresponding memory, e.g., a volatile memory such as RAM or a non-volatile memory such as Flash (not shown). The devices and servers may for example be equipped with microprocessors and memories (not shown). Alternatively, the devices and server may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
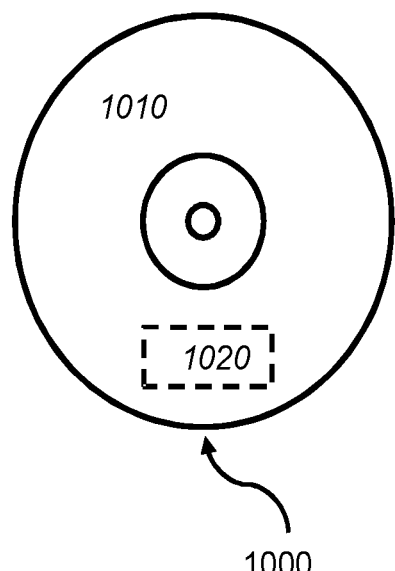
FIG. 7*a* shows a computer readable medium.

FIG. 7a shows a computer readable medium 1000 having a writable part 1010 comprising a computer program 1020, the computer program 1020 comprising instructions for causing a processor system to perform one or more of the above methods in the system as described above. The computer program 1020 may be embodied on a non-transient computer readable medium 1000 as physical marks or by means of magnetization of elements of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 7B:
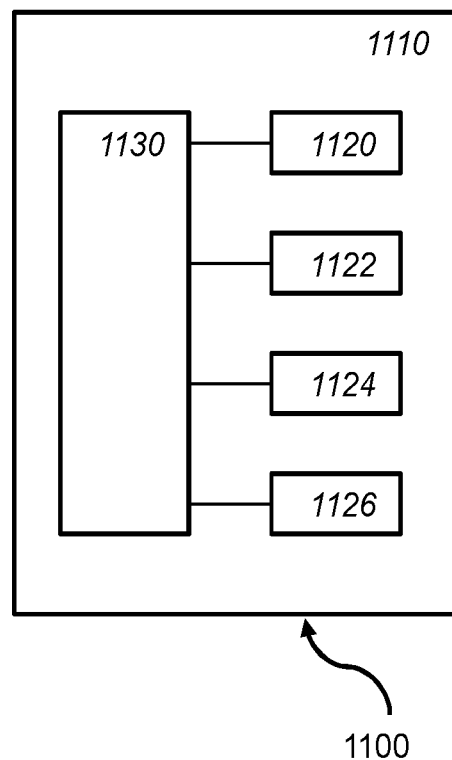
FIG. 7*b* shows in a schematic representation of a processor system.

FIG. 7b shows in a schematic representation of a processor system 1100 according to an embodiment of the device or server as described above. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

In summary, a wireless communication system may have an initiator device and a responder device arranged for wireless communication. The wireless communication system enables one-sided authentication of a responder device by an initiator device and mutual authentication of both devices. Embodiments of the initiator may have a message unit and a state machine. The initiator starts by acquiring a responder public key via an out-of-band action and sends an authentication request. The responder sends an authentication response comprising responder authentication data based on a responder private key and a mutual progress status indicative of the mutual authentication being in progress for enabling the responder device to acquire an initiator public key via a responder out-of-band action. The initiator state machine is arranged to provide a mutual authenticating state, engaged upon receiving the mutual progress status, for awaiting mutual authentication. Thereby long time-out periods during wireless communication are avoided, while also enabling the initiator to report communication errors to the user within a short time.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. An initiator device arranged for wireless communication with a responder device according to a communication protocol comprising:
   an initiator transceiver, wherein the initiator transceiver is arranged to wirelessly communicate according to the communication protocol; and
   an initiator processor, wherein the initiator processor is arranged to process the communication protocol, the initiator processor comprising:
      an initiator message unit,
         wherein the initiator message unit is arranged to compose messages to be sent to the responder device,
         wherein the initiator message unit is arranged to decompose messages received from the responder device according to an authentication protocol; and
      an initiator state machine, wherein the initiation state machine provides initiator states according to the authentication protocol in dependence on user interaction and messages received from the responder device, the initiator states comprising:
         an initial state (IST) for bootstrapping by acquiring a responder public key from the responder device via an initiator out-of-band action;
         a bootstrapped state (BST) indicating that the bootstrapping has been successfully performed by acquiring the responder public key; and
         an authenticated state (ATD) indicating that the authentication has been successfully performed;
   wherein the initiator message unit is arranged to compose an authentication request (ARQ),
   wherein the initiator message is sent in the bootstrapped state,
   wherein the initiator message comprises:
      an initiator verifier (H($B_I$)) for verifying an initiator public key; and
      a responder verifier (H($B_R$)) for verifying the responder public key;
   wherein the initiator message unit is arranged to decompose an authentication response (ARP1),
   wherein authentication response (ARP1) comprises responder one-sided authentication data ({R-auth1}$_{k1}$) based on a responder private key ($b_R$) corresponding to the responder public key ($B_R$) and a mutual progress status (MPS) indicative of the mutual authentication which is in progress for enabling the responder device to acquire the initiator public key from the initiator device via a responder out-of-band action; and
   wherein the initiator message unit is arranged to decompose a mutual authentication response (ARP2), wherein the mutual authentication response (ARP2) comprises mutual responder authentication data ({R-auth2}$_{k2}$) based on the initiator public key ($B_I$) and the responder private key ($b_R$);
   wherein the initiator message unit is arranged to compose a mutual authentication confirm (ACF2), wherein the mutual authentication confirm (ACF2) comprises a mutual confirm status (MCS) indicating confirmation of the mutual authentication and mutual initiator authentication data ({I-auth2}$_{k2}$) based on the responder public key ($B_R$) and an initiator private key ($b_I$) corresponding to the initiator public key ($B_I$).

2. The initiator device as claimed in claim 1,
   wherein the initiator state machine is arranged to provide a mutual authenticating state,
   wherein the mutual authenticating state is engaged upon receiving the mutual progress status,
   wherein the mutual authenticating state is arranged to await mutual authentication.

3. The initiator device as claimed in claim 2,
   wherein the initiator state machine is arranged to engage the authenticated state upon receiving the mutual authentication response (ARP2) and the initiator processor successfully processes the mutual responder authentication data based on the responder public key and an initiator private key ($b_I$),
   wherein the initiator private key ($b_I$) corresponds to the initiator public key ($B_I$).

4. The initiator device as claimed in claim 3, wherein the initiator state machine is arranged to engage the bootstrapped state or the initial state upon receiving the authentication response (ARP1) and the initiator processor unsuccessfully processes the responder one-sided authentication data ({R-auth1}$_{k1}$).

5. The initiator device as claimed in claim 3, wherein the initiator state machine is arranged to engage the bootstrapped state or the initial state upon receiving the mutual authentication response (ARP2) and the initiator processor unsuccessfully processes the mutual responder authentication data ({R-auth2}$_{k2}$).

6. The initiator device as claimed in claim 3,
   wherein the initiator message unit is arranged to compose an awaiting authentication confirm (ACF1), upon receiving the mutual progress status,
   wherein the awaiting authentication confirm (ACF1) comprises comprising a mutual awaiting status (MAS).

7. The initiator device as claimed in claim 1,
   wherein the initiator message unit is arranged to decompose, a one-sided authentication response (ARP1) in the event of the one-sided authentication,
   wherein the one-sided authentication comprises one-sided responder authentication data ({R-auth1}$_{k1}$), wherein the one sided responder authentication data ($\{R\text{-auth1}\}_{k1}$) is based on a responder private key ($b_R$), wherein the responder private key (bR) corresponds to the responder public key ($B_R$) and a one-sided status indicative of the one-sided authentication, wherein the initiator state machine is arranged to engage the authenticated state upon the initiator processor successfully processing the one-sided responder authentication data ($\{R\text{-auth1}\}_{k1}$) based on the responder public key and an initiator private key ($p_I$), wherein the initiator private key ($p_I$) corresponds to an initiator public key ($P_I$).

8. A responder device arranged for wireless communication with an initiator device according to a communication protocol comprising:

a responder transceiver, wherein the responder transceiver is arranged for wireless communication according to the communication protocol; and a responder processor, wherein the responder processor is arranged to process the communication protocol the response processor comprising:

a responder message unit, wherein the responder message unit is arranged to compose messages to be sent to the initiator device, wherein the responder message unit is arranged to decompose messages received from the initiator device according to the authentication protocol wherein the responder message unit is arranged to compose an authentication response (ARP1), wherein the authentication response (ARP1) comprises a one-sided responder authentication data ($\{R\text{-auth1}\}_{k1}$) based on a responder private key ($b_R$) and a mutual progress status indicative of the mutual authentication being in progress, wherein the responder private key ($b_R$) corresponds to the responder public key ($B_R$), wherein the responder message unit is arranged to decompose messages comprising an authentication request (ARQ), wherein the authentication request (ARQ) comprises a initiator verifier ($H(B_I)$) and a responder verifier ($H(B_R)$), wherein the initiator verifier ($H(B_I)$) is arranged to verify an initiator public key, wherein the responder verifier ($H(B_R)$) is arranged to verify the responder public key; and a responder state machine, wherein the responder state machine provides responder states according to the authentication protocol in dependence on user interaction and messages received from the initiator device, the responder states comprising:

an awaiting state (AWG) for receiving messages from the initiator; and a responder authenticated state (ATD) indicating that the authentication has been successfully performed;

wherein the responder state machine is arranged to engage the responder authenticated state, upon the responder processor successfully processing the initiator authentication data ($\{I\text{-auth2}\}$) based on the initiator public key ($B_I$ and the responder private key ($b_R$).

9. The responder device as claimed in claim 8, wherein the responder state machine is arranged to provide a mutual responder authenticating state (AR2), wherein the mutual responder authenticating state (AR2) is arranged to enable the responder device to acquire an initiator public key from the initiator device via a responder out-of-band action, wherein the responder message unit is arranged to compose a mutual authentication response (ARP2), wherein the mutual authentication response (ARP2) is arranged to be sent in the mutual responder authenticating state, wherein the mutual authentication response (ARP2) comprises mutual responder authentication data ($\{R\text{-auth2}\}_{k2}$) based on the initiator public key ($B_I$ and a responder private key ($b_R$) corresponding to the responder public key ($B_R$);

wherein the responder message unit is arranged to decompose a mutual authentication confirm (ACF2), wherein the mutual authentication confirm (ACF2) comprises a mutual confirm status, wherein the mutual confirm status indicates confirmation of the mutual authentication and mutual initiator authentication data ($\{I\text{-auth2}\}_{k2}$) based on the responder public key ($B_R$) and an initiator private key ($b_1$), wherein the initiator private key ($b_I$) corresponds to the initiator public key ($B_I$).

10. The responder device as claimed in claim 9, wherein the responder state machine is arranged to engage the awaiting state upon receiving the mutual authentication confirm (ACF2) and the responder processor unsuccessfully processes the mutual initiator authentication data ($\{I\text{-auth2}\}_{k2}$).

11. The responder device as claimed in claim 9, wherein the responder message unit is arranged to decompose an awaiting mutual authentication confirm (ACF1), wherein the mutual authentication confirm (ACF1) comprises a mutual awaiting status, wherein the responder state machine is arranged to engage the mutual responder authenticating state (AR2) upon receiving the mutual awaiting status.

12. The responder device as claimed in claim 11, wherein the responder message unit is arranged to further decompose the awaiting authentication confirm (ACF1), wherein the awaiting authentication confirm (ACF1) comprises one-sided initiator authentication data ($\{I\text{-auth1}\}_{k1}$), and wherein the responder state machine is arranged to engage the awaiting state upon the responder processor unsuccessfully processing the one-sided initiator authentication data.

13. The responder device as claimed in claim 8, wherein the responder message unit is arranged to compose a one-sided authentication response (ARP1) in the event of the one-sided authentication, the one-sided authentication response (ARP1) comprising one-sided responder authentication data ($\{R\text{-auth1}\}_{k1}$) based on a responder private key ($b_R$) and a one-sided status indicative of the one-sided authentication, wherein responder private key ($b_R$) corresponds to the responder public key ($B_R$), wherein the responder state machine is arranged to, in the event of the one-sided authentication, engage the responder authenticated state upon receiving a one-sided authentication confirm (ACF1) and the responder processor successfully processes one-sided initiator authentication data ($\{I\text{-auth1}\}_{k1}$).

14. The responder device as claimed in claim 8, wherein the responder device comprises a responder user interface, wherein the responder user interface is arranged to accommodate user interaction, wherein the user interface is arranged to perform the responder out-of-band action to acquire the initiator public key from the initiator device.

* * * * *